United States Patent
Li

(10) Patent No.: US 8,282,208 B2
(45) Date of Patent: Oct. 9, 2012

(54) COUPLING STRUCTURE FOR EYEGLASSES

(75) Inventor: Hsing-Chen Li, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 219 days.

(21) Appl. No.: 12/824,553

(22) Filed: Jun. 28, 2010

(65) Prior Publication Data

US 2011/0317123 A1 Dec. 29, 2011

(51) Int. Cl.
*G02C 5/00* (2006.01)

(52) U.S. Cl. ........ 351/140; 351/111; 351/121; 351/153; 16/228

(58) Field of Classification Search .................. 351/111, 351/115, 118, 119, 121, 140, 153, 156, 157; 16/228

See application file for complete search history.

(56) References Cited

U.S. PATENT DOCUMENTS

| 7,645,039 B2* | 1/2010 | Sheldon | 351/110 |
| 2004/0057009 A1* | 3/2004 | Chen | 351/140 |
| 2008/0266515 A1* | 10/2008 | Hou | 351/140 |

* cited by examiner

*Primary Examiner* — Thomas K Pham
*Assistant Examiner* — Vipin Patel
(74) *Attorney, Agent, or Firm* — Rosenberg, Klein & Lee

(57) ABSTRACT

The coupling structure for a pair of eyeglasses includes a one-piece lens, a pair of connecting elements and a pair of temples. Each pair of fixing articles of the lens are inserted through each curved groove of each connecting element and respectively into the extension through holes in both distal ends of each curved groove, so as for each pair of fixing articles to respectively protrude outward both extension through holes, and each flange in each hollow is caught in each concave of each curved groove so as for each connecting element to be firmly coupled to each end of the lens. Each pair of fixing articles outward each pair of extension through holes are respectively inlaid in each pair of receiving rooms in both distal ends of each curved portion of each temple, and each curved portion is caught in each curved opening of each connecting element, so as for each temple to be pivotally coupled to each end of the lens as well as each connecting element.

8 Claims, 6 Drawing Sheets

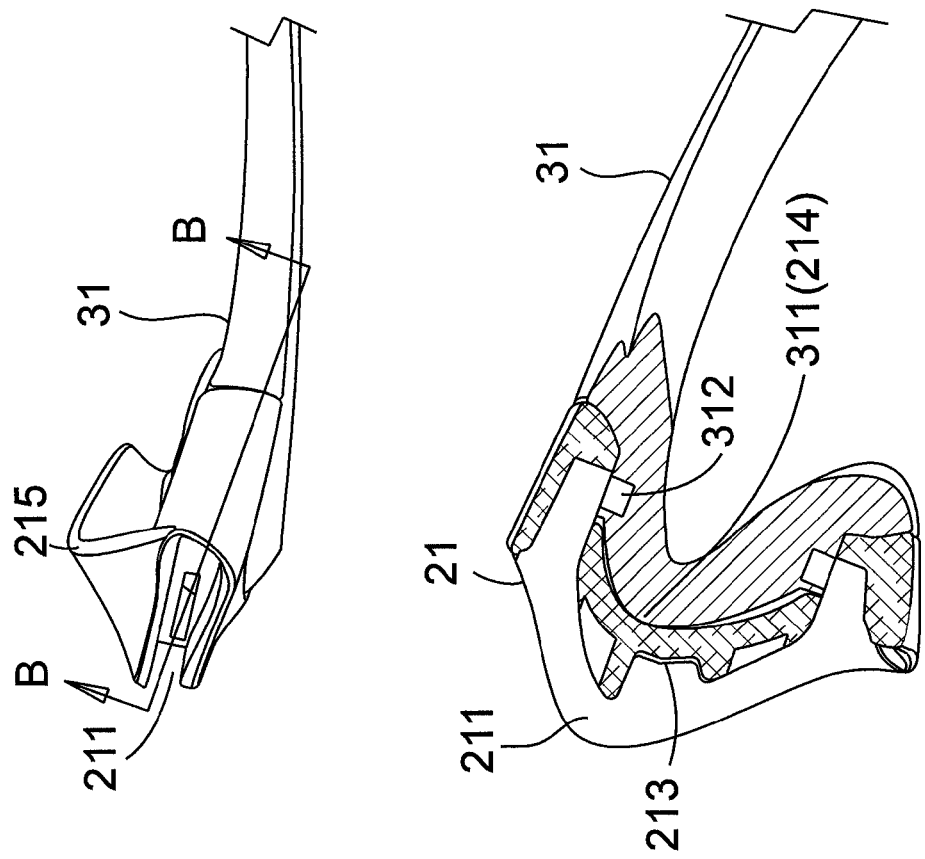
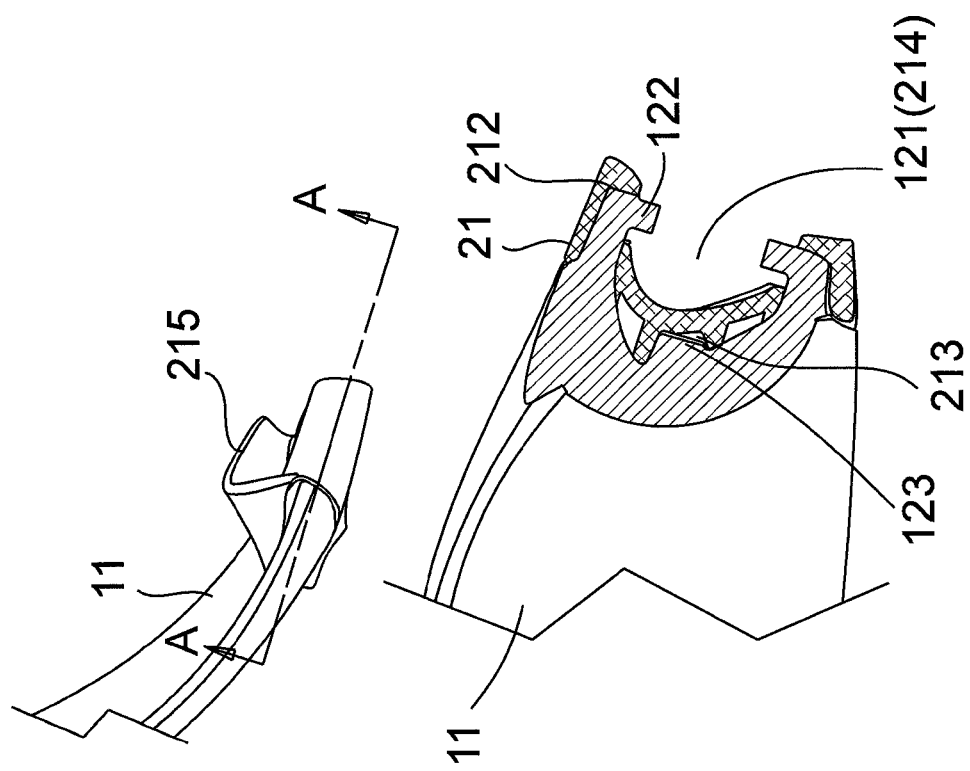
Fig. 5
Fig. 4

COUPLING STRUCTURE FOR EYEGLASSES

BACKGROUND OF THE INVENTION

1. Field of the Invention

The present invention is related to a coupling structure for a pair of eyeglasses, with innovatory convenience and comfort features, and more particularly to a coupling structure in which connecting elements are used for completing the pivotal connection between a one-piece lens and temples.

2. Description of the Related Art

As the continuous development of technology, various new products are emerged in the current market. Eyeglasses also become an indispensable device in the daily life of modern people. Eyeglasses for myopia, presbyopia and vision correction emphasize practicality, eyeglasses for industry use, sunglasses and windproof eyeglasses emphasize functionality, and stylized eyeglasses emphasize aesthetic appearance and fashion.

In addition to the practicality, functionality or aesthetic appearance, a pair of eyeglasses must be worn comfortably. A most common style of eyeglasses in the current market is a pair of eyeglasses with only a pair of lenses or a one-piece lens. This kind of frameless eyeglasses is popular with most people because it is light to be worn. However, it is still not so comfortable to wear a pair of frameless eyeglasses because the lenses or temples may touch a wearer's face.

BRIEF SUMMARY OF THE INVENTION

Therefore, in order to solve the above-mentioned problems, the present invention is to provide a coupling structure for a pair of eyeglasses that substantially obviates the drawbacks of the related conventional art.

A primary objective of the present invention is to provide a coupling structure for a pair of eyeglasses, in which connecting elements are used for completing the pivotal connection of a one-piece lens and temples.

Another primary objective of the present invention is to provide a coupling structure for a pair of eyeglasses, which is assembled with a simpler method for saving time and manpower cost spent in assembly and disassembly.

Still another primary objective of the present invention is to provide a coupling structure for a pair of eyeglasses, whose connecting elements are made of soft material so as for a wearer to feel comfortable when the connecting elements being in contact with a wearer's face.

Yet another primary objective of the present invention is to provide a coupling structure for a pair of eyeglasses, which provides better effects of tight and pivotal connection between a one-piece lens and temples.

According to above objectives, the present invention provides a coupling structure for a pair of eyeglasses. The coupling structure includes at least a one-piece lens, at least a pair of connecting elements and at least a pair of temples. Each pair of fixing articles are inserted through each curved groove of each connecting element and respectively into and through the extension through holes in both distal ends of each curved groove, so as for each pair of fixing articles to respectively protrude outward both extension through holes, and each flange in each hollow is caught in each concave of each curved groove so as for each connecting element to be firmly coupled to each end of the lens. Each pair of fixing articles outward each pair of extension through holes are respectively inlaid in each pair of receiving rooms in both distal ends of each curved portion of each temple, and each curved portion is caught in each curved opening of each connecting element, so as for each temple to be pivotally coupled to each end of the lens as well as each connecting element. While the pair of eyeglasses with the coupling structure of the present invention being worn, a wearer will feel comfortable because each attachment piece of each connecting element provides soft and tender contact with the face of a wearer.

BRIEF DESCRIPTION OF THE DRAWINGS

The invention as well as a preferred mode of use, further features and advantages thereof will best be understood by reference to the following detailed description of the illustrative embodiments when read in conjunction with the accompanying drawings, wherein:

FIG. 4 is a cross sectional view taken along line A-A of a preferred embodiment of a lens and a connecting element of the coupling structure in an assembled configuration in accordance with the present invention;

FIG. 5 is a cross sectional view taken along line B-B of a preferred embodiment of a connecting element and a temple of the coupling structure in an assembled configuration in accordance with the present invention;

DETAILED DESCRIPTION OF THE PREFERRED EMBODIMENTS

The present invention discloses a coupling structure for a pair of eyeglasses, and some detailed parts of process for manufacturing or processing eyeglasses are accomplished by applying prior art. Therefore, these parts will not be completely depicted in the description below. The drawings referred in the following are not made according to the actual related sizes, and the function of these drawings is only for illustrating characteristics related to the present invention.

Figure 1:
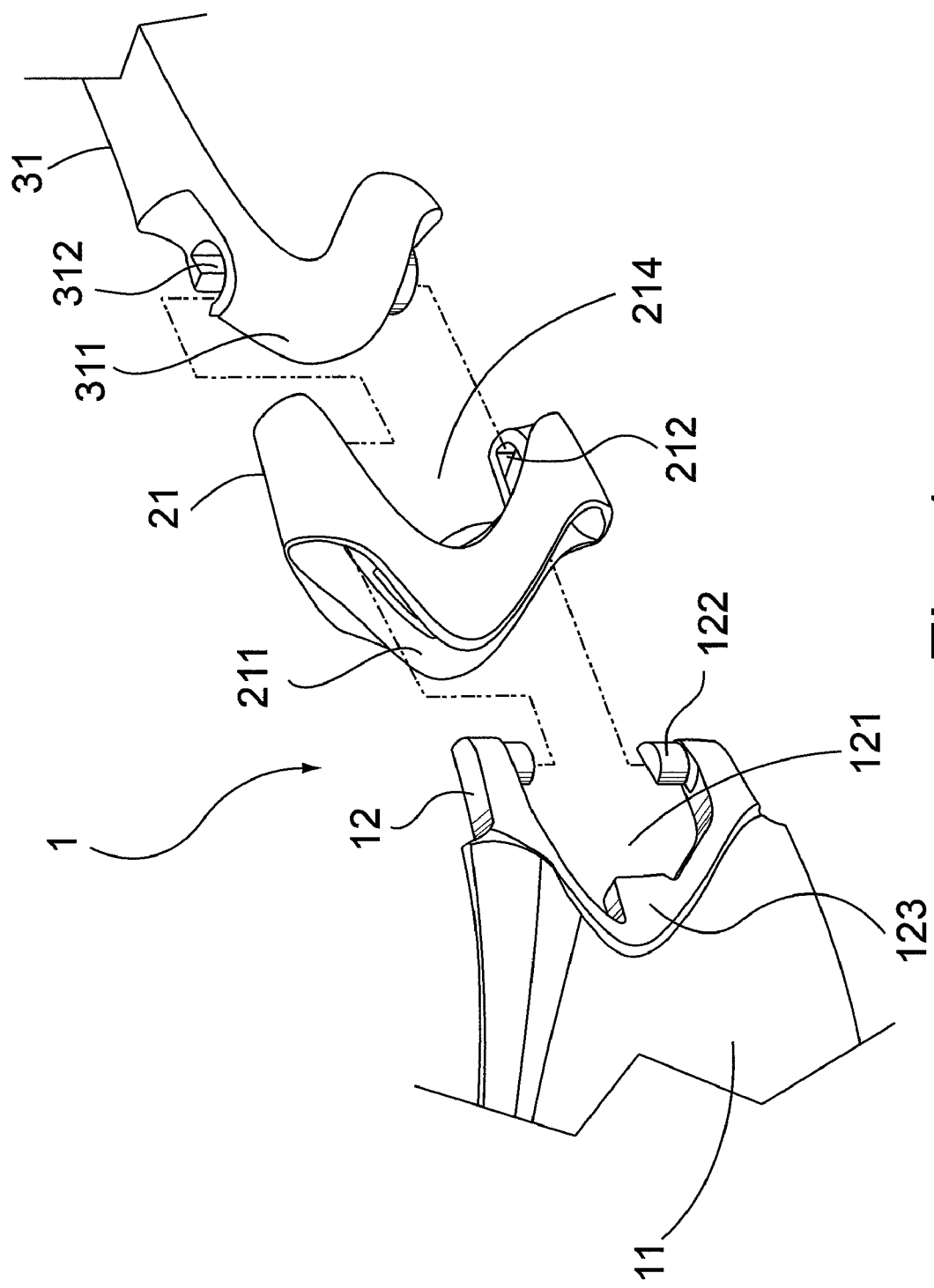
FIG. 1 is a perspective exploded view of a preferred embodiment of the coupling structure for a pair of eyeglasses in accordance with the present invention.
Figure 3:
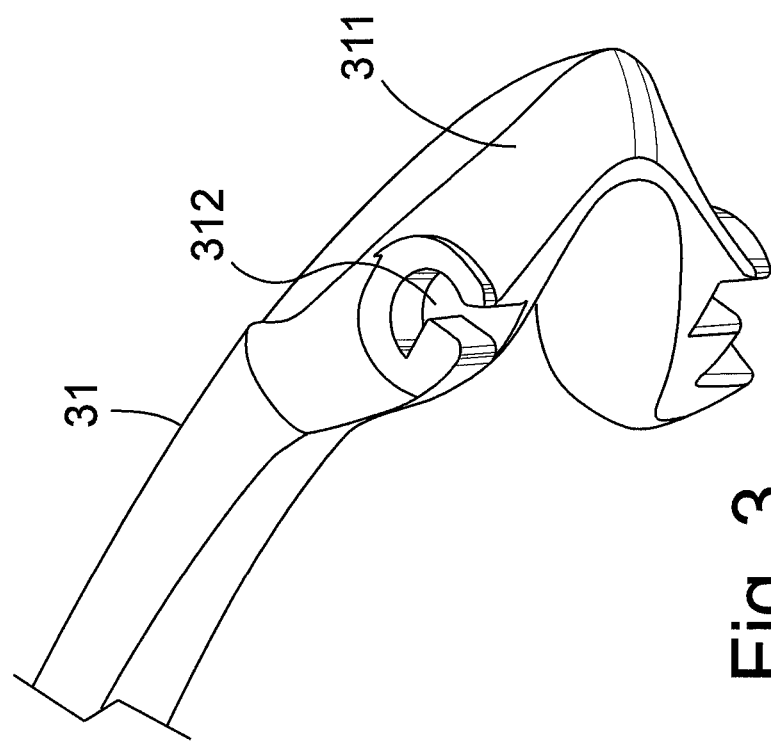
FIG. 3 is a perspective view of a preferred embodiment of a temple of the coupling structure in accordance with the present invention.
Figure 2:
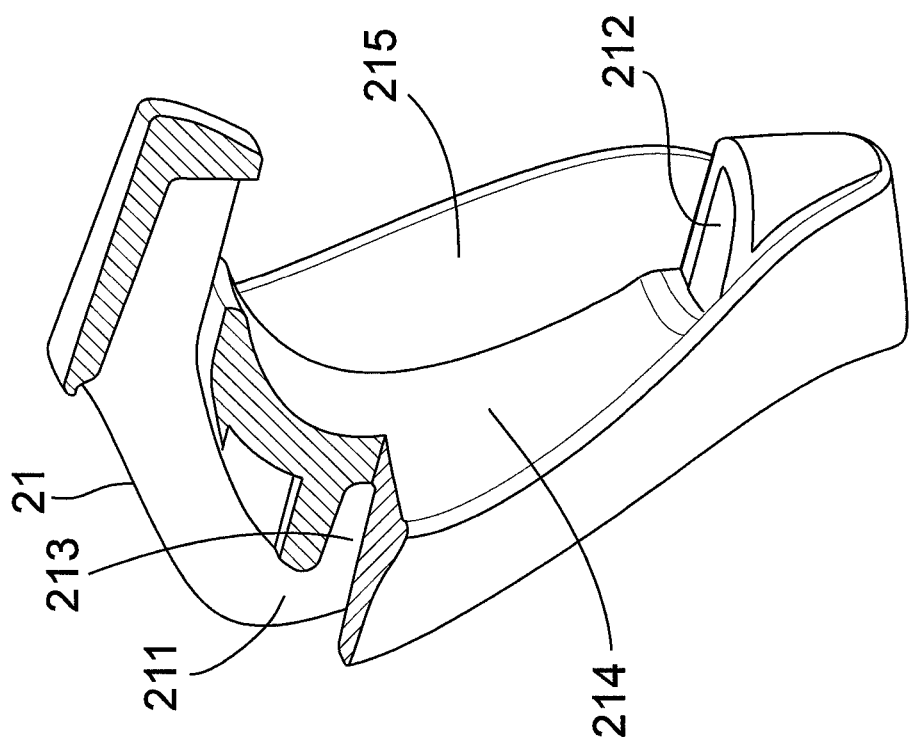
FIG. 2 is a perspective view of a preferred embodiment of a connecting element of the coupling structure in accordance with the present invention.

FIG. 1 is a perspective exploded view of a preferred embodiment of the coupling structure for a pair of eyeglasses 1 according to the present invention. The coupling structure of the pair of eyeglasses 1 is assembled by at least a one-piece lens 11, at least a pair of connecting elements 21, and at least a pair of temples 31. The one-piece lens 11 is provided with an extension portion 12 in each end, a hollow 121 is formed in each extension portion 12, a pair of opposite fixing articles 122 are respectively disposed at both distal ends of the opening of each hollow 121, each pair of opposite fixing articles 122 correspond to each other upward and downward, and at least a flange 123 is disposed in each hollow 121. Each connecting element 21 is integral and made of soft material. At least a curved groove 211 is formed in one end of each connecting element 21, at least an extension through hole 212 is disposed at each distal end of each curved groove 211, at least a concave 213 is disposed in each curved groove 211, a curved opening 214 is formed at the opposite end of each connecting element 21, and at least an attachment piece 215 is disposed on one side of each curved groove 211, as shown in FIG. 2. The front end of each temple 31 is formed a curved portion 311, and at least a receiving room 312 is disposed in each distal end of each curved portion 311, as shown in FIG. 3.

While being assembled, referring to FIGS. 4 and 5, each pair of fixing articles 122 are inserted through each curved groove 211 of each connecting element 21 and respectively into and then through the extension through holes 212 in both distal ends of each curved groove 211, so as for each pair of fixing articles 122 to respectively protrude outward both extension through holes 212, and each flange 123 in each hollow 121 is caught in each concave 213 of each curved groove 211 so as for each connecting element 21 to be firmly coupled to each end of the lens 11. Then each pair of fixing articles 122 outward each pair of extension through holes 212 are respectively inlaid in each pair of receiving rooms 312 in both distal ends of each curved portion 311 of each temple 31, and each curved portion 311 is caught in each curved opening 214 of each connecting element 21, so as for each temple 31 to be pivotally coupled to each end of the lens 11 as well as each connecting element 21. While the pair of eyeglasses 1 with the coupling structure of the present invention being worn, a wearer will feel comfortable because each attachment piece 215 of each connecting element 21 provides soft and tender contact with the face of a wearer.

Figure 6:
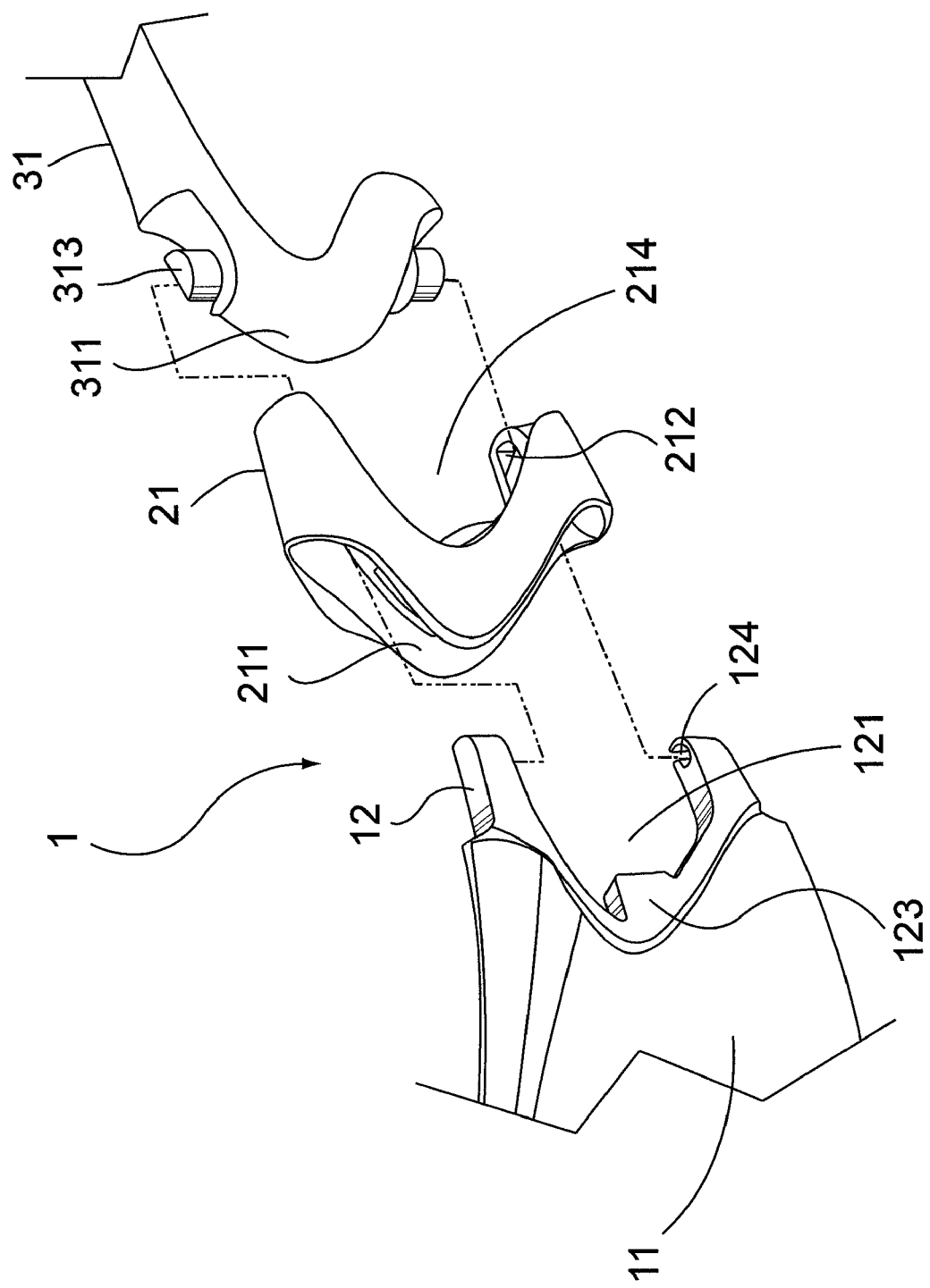
FIG. 6 is a perspective exploded view of another preferred embodiment of the coupling structure for a pair of eyeglasses in accordance with the present invention.
Figure 8:
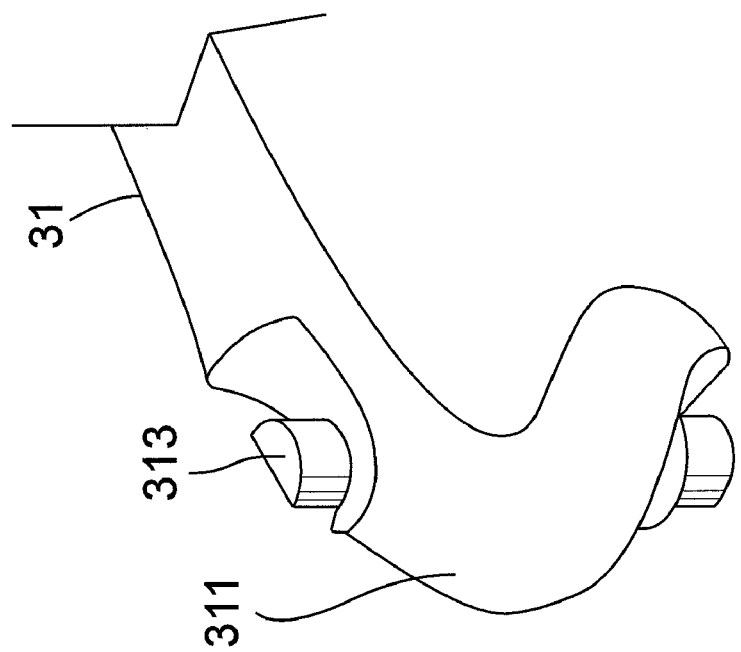
FIG. 8 is a perspective view of another preferred embodiment of a temple of the coupling structure in accordance with the present invention.
Figure 7:
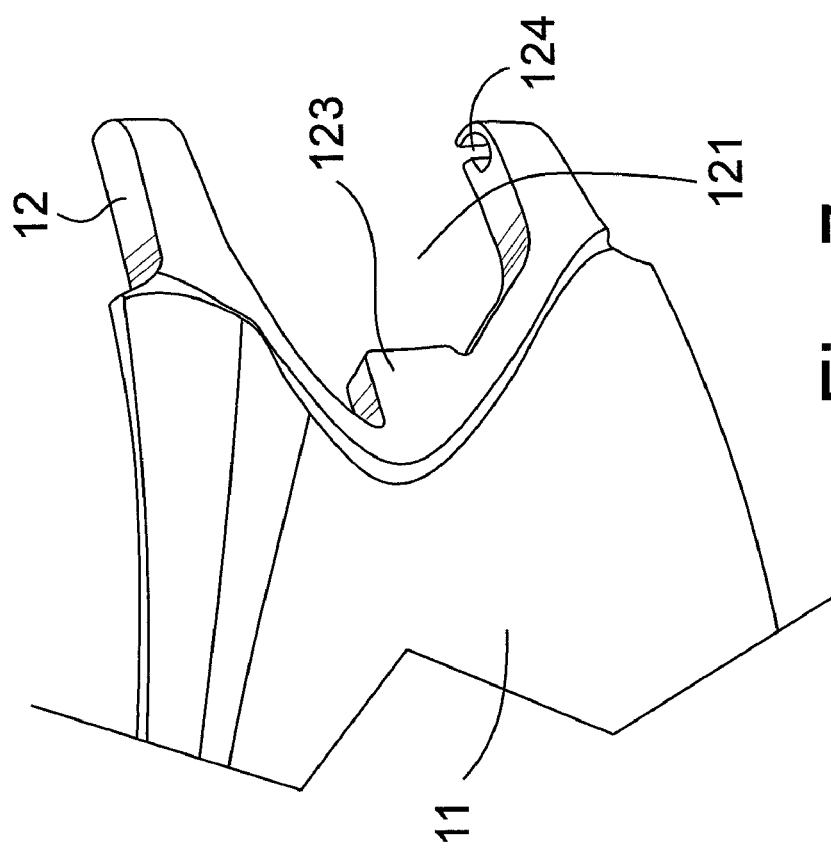
FIG. 7 is a perspective view of another preferred embodiment of a connecting element of the coupling structure in accordance with the present invention.

FIG. 6 is a perspective exploded view of another preferred embodiment of the coupling structure for a pair of eyeglasses 1 according to the present invention. The coupling structure of the pair of eyeglasses 1 is assembled by at least a one-piece lens 11, at least a pair of connecting elements 21, and at least a pair of temples 31. The one-piece lens 11 is provided with an extension portion 12 in each end, a hollow 121 is formed in each extension portion 12, at least a receiving room 124 is disposed in each distal end of the opening of each hollow 121, and at least a flange 123 is disposed in each hollow 121, as shown in FIG. 7. Each connecting element 21 is integral and made of soft material. At least a curved groove 211 is formed in one end of each connecting element 21, at least an extension through hole 212 is disposed at each distal end of each curved groove 211, at least a concave 213 is disposed in each curved groove 211, a curved opening 214 is formed at the opposite end of each connecting element 21, and at least an attachment piece 215 is disposed on one side of each curved groove 211. The front end of each temple 31 is formed a curved portion 311, and at least a pair of opposite fixing articles 313 are respectively disposed on and below both distal ends of each curved portion 311, as shown in FIG. 8.

Figure 10:
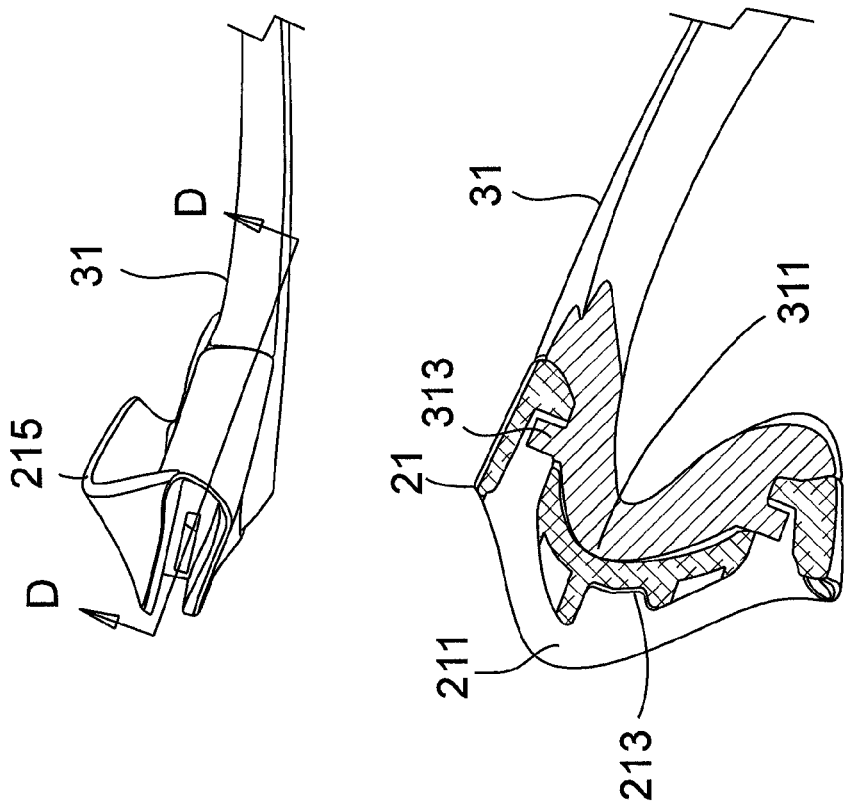
Figure 9:
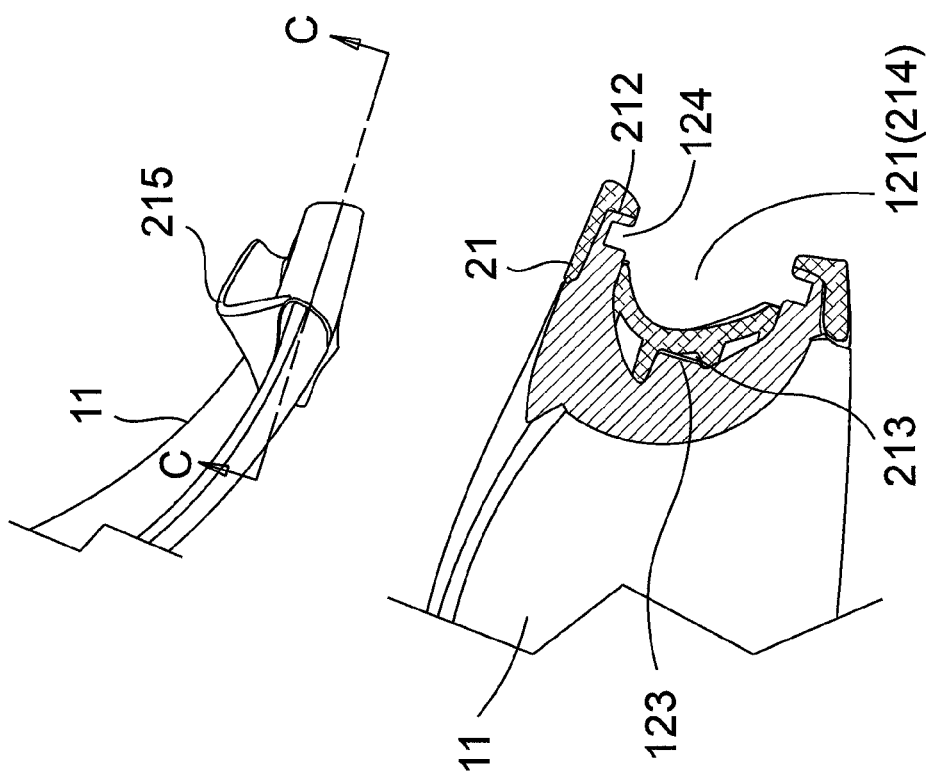
FIG. 9 is a cross sectional view taken along line C-C of another preferred embodiment of a lens and a connecting element of the coupling structure in an assembled configuration in accordance with the present invention; and, FIG. 10 is a cross sectional view taken along line D-D of another preferred embodiment of a connecting element and a temple of the coupling structure in an assembled configuration in accordance with the present invention.

While being assembled, referring to FIGS. 9 and 10, each extension portion 12 of the lens 11 is inserted through each curved groove 211 of each connecting element 21, so as for each pair of receiving rooms 124 of each hollow 121 to respectively correspond to each pair of extension through holes 212 of each curved groove 211, and each flange 123 in each hollow 121 is caught in each concave 213 of each curved groove 211, so as for each connecting element 21 to be firmly coupled to each end of the lens 11. Then each curved portion 311 of each temple 31 is inlaid in each curved opening 214 of each connecting element 21 with each pair of opposite fixing articles 313 of each curved portion 311 respectively penetrating each pair of extension through holes 212 of each curved groove 211 and being inlaid in each pair of receiving rooms 124 of each extension portion 12, so as for each temple 31 to be pivotally coupled to each connecting element 21 as well as each end of the lens 11.

While the present invention has been described above by way of examples and in terms of the preferred embodiments, it is to be recognized and understood that the present invention is not limited to the disclosed embodiments, it is intended to cover various modifications and similar arrangements as may be made thereto, and the scope of the appended claims should be accorded the broadest interpretation so as to encompass all such modifications which may fall within the spirit and the invention.

What is claimed is:

1. A coupling structure for a pair of eyeglasses, comprising:
   at least a lens, said lens being provided with at least an extension portion disposed in each end of said lens, at least a hollow being formed in each said extension portion, and at least a pair of opposite fixing articles being respectively disposed at distal ends of each said hollow;
   at least a pair of connecting elements being integral and made of soft material, at least a curved groove being formed in one end of each said connecting element, and at least an extension through hole being disposed at each distal end of each said curved groove;
   at least a pair of temples, a front end of each said temple being formed a curved portion, and at least a receiving room being disposed in each distal end of each said curved portion; and,
   at least an attachment piece is disposed on one side of each said curved groove of each said connecting element;
   wherein each pair of said fixing articles being inserted through each said curved groove of each said connecting element and respectively into each pair of said extension through holes so as for each said connecting element to be firmly coupled to each end of said lens, and each pair of said fixing articles outward each pair of said extension through holes being respectively inlaid in each pair of said receiving rooms of each said temple, so as for each said temple to be pivotally coupled to each end of said lens as well as each said connecting element.

2. The coupling structure for a pair of eyeglasses according to claim 1, wherein at least a concave is disposed in each said curved groove of each said connecting element.

3. The coupling structure for a pair of eyeglasses according to claim 1, wherein at least a curved opening is formed at an opposite end of each said connecting element.

4. The coupling structure for a pair of eyeglasses according to claim 1, wherein each pair of said fixing articles respectively protrude outward each pair of said extension through holes of each said connecting element.

5. A coupling structure for a pair of eyeglasses, comprising:
   at least a lens, said lens being provided with at least an extension portion disposed in each end of said lens, at least a hollow being formed in each said extension portion, and at least a pair of opposite fixing articles being respectively disposed at distal ends of each said hollow;
   at least a pair of connecting elements being integral and made of soft material, at least a curved groove being formed in one end of each said connecting element, and at least an extension through hole being disposed at each distal end of each said curved groove; and, at least a pair of temples, a front end of each said temple being formed a curved portion, and at least a receiving room being disposed in each distal end of each said curved portion;

wherein each pair of said fixing articles being inserted through each said curved groove of each said connecting element and respectively into each pair of said extension through holes so as for each said connecting element to be firmly coupled to each end of said lens, each pair of said fixing articles outward each pair of said extension through holes being respectively inlaid in each pair of said receiving rooms of each said temple, so as for each said temple to be pivotally coupled to each end of said lens as well as each said connecting element and each pair of said fixing articles respectively protrude outward each pair of said extension through holes of each said connecting element.

6. The coupling structure for a pair of eyeglasses according to claim 5, wherein at least an attachment piece is disposed on one side of each said curved groove of each said connecting element.

7. The coupling structure for a pair of eyeglasses according to claim 5, wherein at least a concave is disposed in each said curved groove of each said connecting element.

8. The coupling structure for a pair of eyeglasses according to claim 5, wherein at least a curved opening is formed at an opposite end of each said connecting element.

* * * * *